US006862852B1

(12) United States Patent
Beele

(10) Patent No.: US 6,862,852 B1
(45) Date of Patent: Mar. 8, 2005

(54) SEALING SYSTEM AND GASKET THEREFOR

(75) Inventor: Johannes A. Beele, Aalten (NL)

(73) Assignee: Beele Engineering, B.V., Aalten (NL)

( * ) Notice: Subject to any disclaimer, the term of this patent is extended or adjusted under 35 U.S.C. 154(b) by 41 days.

(21) Appl. No.: 10/048,439

(22) PCT Filed: Jul. 18, 2000

(86) PCT No.: PCT/NL00/00502

§ 371 (c)(1),
(2), (4) Date: May 14, 2002

(87) PCT Pub. No.: WO01/09538

PCT Pub. Date: Feb. 8, 2001

(30) Foreign Application Priority Data

Aug. 2, 1999 (NL) .............................................. 1012759

(51) Int. Cl.$^7$ .............................. E04B 1/94; E04C 2/52
(52) U.S. Cl. ........................ 52/220.8; 52/232; 52/317; 137/67; 137/72; 137/76
(58) Field of Search ................................ 52/220.8, 232, 52/317, 220.1, 220.2, 220.3, 220.4, 220.5; 137/72, 75, 360, 67, 68.11, 70, 71, 76; 285/194, 187; 277/935, 929, 931, 26

(56) References Cited

U.S. PATENT DOCUMENTS

| | | | | |
|---|---|---|---|---|
| 4,086,736 A | * | 5/1978 | Landrigan ..................... | 52/221 |
| 4,796,401 A | * | 1/1989 | Wexler ......................... | 52/232 |
| 5,058,341 A | * | 10/1991 | Harbeke, Jr. ................. | 52/232 |
| 5,103,609 A | * | 4/1992 | Thoreson et al. ............. | 52/232 |
| 5,105,592 A | * | 4/1992 | MacMillan et al. ........... | 52/232 |
| 5,155,957 A | * | 10/1992 | Robertson et al. ............ | 52/232 |
| 5,174,077 A | * | 12/1992 | Murota ........................ | 52/232 |
| 5,347,767 A | * | 9/1994 | Roth ............................ | 52/232 |
| 5,351,448 A | | 10/1994 | Gohlke et al. | |
| 5,407,214 A | * | 4/1995 | Lew et al. .................... | 277/26 |
| 5,427,386 A | * | 6/1995 | Breaker ....................... | 277/26 |
| 5,456,050 A | | 10/1995 | Ward | |
| 5,634,304 A | * | 6/1997 | Sakno .......................... | 52/232 |
| 6,176,052 B1 | * | 1/2001 | Takahashi .................... | 52/232 |
| 6,470,635 B2 | * | 10/2002 | Cornwall ................... | 52/220.8 |

FOREIGN PATENT DOCUMENTS

| | | | | |
|---|---|---|---|---|
| FR | 2 235 328 A | | 1/1975 | .......... F16L/55/12 |
| NL | 177 516 C | | 10/1985 | .......... F16L/25/00 |

* cited by examiner

*Primary Examiner*—Jeanette E. Chapman
(74) *Attorney, Agent, or Firm*—Moser, Patterson & Sheridan, L.L.P.

(57) ABSTRACT

The invention releases to a sealing system comprising a cylindrical tube of a material that is capable of deformation under the influence of a temperature increase, and a gasket of an at least partially elastic material for sealingly retaining the tube in a lead-through housing coaxial with the tube by forming a collar therearound, wherein said gasket is made of a fire-retardant material with a base of a cross-linkable material and an expandable material, in such an amount and of such a composition that a temperature increase above the plasticizing point of the tube will cause the gasket to expand to such an extent that the tube is compressed and a medium-tight seal of the lead-through housing and the tube is obtained.

12 Claims, 1 Drawing Sheet

SEALING SYSTEM AND GASKET THEREFOR

The invention relates to a sealing system comprising a cylindrical tube of a material that is capable of deformation under the influence of a temperature increase, and a gasket of an at least partially elastic material for sealingly retaining the tube in a lead-through housing coaxial with the tube by forming a collar therearound in a circular space, and also to the gasket as such.

Sealing systems of this kind are already known from NL-A-177516 in the name of the present applicant. Said application relates to a plug which is dividable in longitudinal direction.

One aspect of the invention concerns an improvement of the gasket presented therein, but more in general it relates to general sealing systems and gaskets as such.

One drawback of these prior art sealing systems is the fact that a temperature increase, for example in the event of a fire, causes the tube to deform, for example due to softening, or the gasket to deform to such an extent that a medium-tight seal is no longer maintained.

This is disadvantageous because mediums, such as gases and liquids, can be transported actively or passively via the lead-through housing and through the tube, which is undesirable for safety reasons.

Another drawback of prior art systems is the fact that the prior art gaskets can move out of the circular space when the material stress increases due to a temperature increase, and will no longer be capable of maintaining the sealing action as such.

Yet another drawback is the fact that the prior art gaskets exhibit shrinkage due to loss of mass in fire situations. The consequence of such shrinkage will be a reduced sealing action.

The object of the invention is to eliminate the above drawbacks, and to that end it provides a sealing system according to claim 1.

Expandable collars exhibiting a sealing action in the event of a fire are already known per se from international patent application WO 97/04838. The collar used therein is a pressed-on collar, however, which comprises a fixed housing in which an expandable material is present, which collar is fixed to a vertical wall at the end of the lead-through housing. Such a pressed-on collar, however, is not suitable for being sealingly inserted into a circular space that is formed between the lead-through housing and the tube that extends therethrough.

The effect of a sealing system according to the invention is that an increase of the ambient temperature, at least to a temperature at which the tube will deform and soften, will result in an expansion reaction of the gasket material. Preferably, the temperature range within which the expansion reaction of the gasket takes place is above the temperature range within which deformation or softening tube occurs. The required insertion force will be smaller when the tube has already softened, of course, and it will be obtained with a smaller amount of expandable material. The collared tube will be compressed as a result of this expansion reaction, as a result of which the entire passage (through the tube and through the housing) will be closed, and the lead-through housing will be filled by the plug thus being formed, because the expanded gasket will fill at least a complete cross-sectional area on the lead-through housing and the tube. This is in particular advantageous in the event of a fire, since transport of mediums such as gases and liquids through the lead-through housing or through the tube will not be possible any more.

In one preferred embodiment the invention relates to a sealing system wherein the tube is made of a plastic or a composite material, for example consisting of a plastic layer-aluminum layer-plastic layer. Tubes of this kind are flexible and the gasket is likewise partially elastic as a result of its composition, so that tube bends can likewise be sealed.

A second aspect of the invention relates to a gasket for the aforesaid sealing system. Preferably, a gasket according to the invention is made of a cross-linked material, for example a rubbery linear polymer, wherein the expandable material is graphite, which is present in an amount of 5–25% by weight.

In a special embodiment said weight percentage is 12.5. This composition ensures an adequate sealing action at usual temperatures of 15–50° C. as well as a suitable expansion at higher temperatures, for example upwards of 50° C.

Fire-retardant compounds are already known per se, in particular flame and/or fire-retardant polymer materials with a base of polychloroprene or with a base of halogen-free polymers from a terpolymer of ethene, propane and a third monomer containing two double carbon—carbon links (diene), which are generally designated EPDM rubbers, or also other rubbery linear polymers, such as vinylmethyl silicone rubber, acrylonitrile butadiene rubber or a copolymer of ethylene and vinyl acetate with fire-retardant additives. Fire-retardant rubbers are also known from EP 0 894 825 and EP 0 861 290.

A special embodiment of such a fire-retardant compound concerns compositions of at least one rubbery linear polymer with the usual fillers, plasticizers and vulcanization materials, such as sulphur, vulcanisation accelerators and activators, as well as 50–200 parts by weight of aluminium oxide hydrate for every 100 parts by weight of said at least one polymer.

The invention will be explained hereafter by means of four examples of compositions for a gasket according to the invention.

| EPDM COMPOUND | |
|---|---|
| Ethylene propylene terpolymer (EPDM) | 100 |
| Aluminium trihydrate $Al_2(OH)_3$ | 135 |
| Polyammonium phosphate | 15 |
| Phosphate ester plasticizer | 5 |
| Interlaced graphite | 35 |
| Zinc oxide (ZnO) | 5 |
| Stearic acid | 1 |
| Polyethylene wax | 3 |
| Zinc salt of an unsaturated fatty acid | 3 |
| Deovule EG28 | 1.7 |
| Perkacit MBTS | 0.3 |
| Sulphur S80 | 2 |
| EVA COMPOUND | |
| Ethyl vinyl acetate copolymer | 100 |
| Aluminium trihydrate $Al_2(OH)_3$ | 75 |
| Polyammonium phosphate | 15 |
| Interlaced graphite | 60 |
| Zinc stereate | 4 |
| Carboxyl acid amide | 5 |
| Polycarbodiimide | 2 |
| Highly viscous silicone polymer (SFR 100) | 10 |
| CR COMPOUND | |
| Polychloroprene rubber | 100 |
| Aluminium trihydrate $Al_2(OH)_3$ | 80 |
| Coated calcium carbonate $CaCO_3$ | 55 |
| Interlaced graphite | 33 |
| Phosphate ester plasticizer | 10 |
| Zinc oxide (ZnO) | 5 |

-continued

| | |
|---|---|
| Stearic acid | 1 |
| Magnesium oxide (MgO) | 4 |
| Polyethylene wax | 5 |
| Colorant green | 3 |
| Colorant black | 0.15 |
| Zinc salt of an unsaturated fatty acid | 2 |
| Vulcacit TMTD | 0.2 |
| Vulcacit D | 0.2 |
| Vulcacit CRV | 1 |
| Sulphur S80 | 0.3 |
| CR COMPOUND | |
| NPC 400 | 100 |
| Aluminium trihydrate Al$_2$(OH)$_3$ | 70 |
| Interlaced graphite | 25 |
| Zinc borate | 25 |
| Magnesium oxide (MgO) | 3 |
| Perkadox BC 40 | 1.6 |

The above exemplary compositions are highly suitable for causing the gasket to expand very quickly at temperatures higher than the plasticizing point of a plastic or composite tube, such that a sealing system according to the invention reacts very quickly to fire conditions, which is a safety-enhancing feature.

A preferred sealing system is shown in perspective, partially cut-away view in the appended drawing, wherein.

Figure 1:
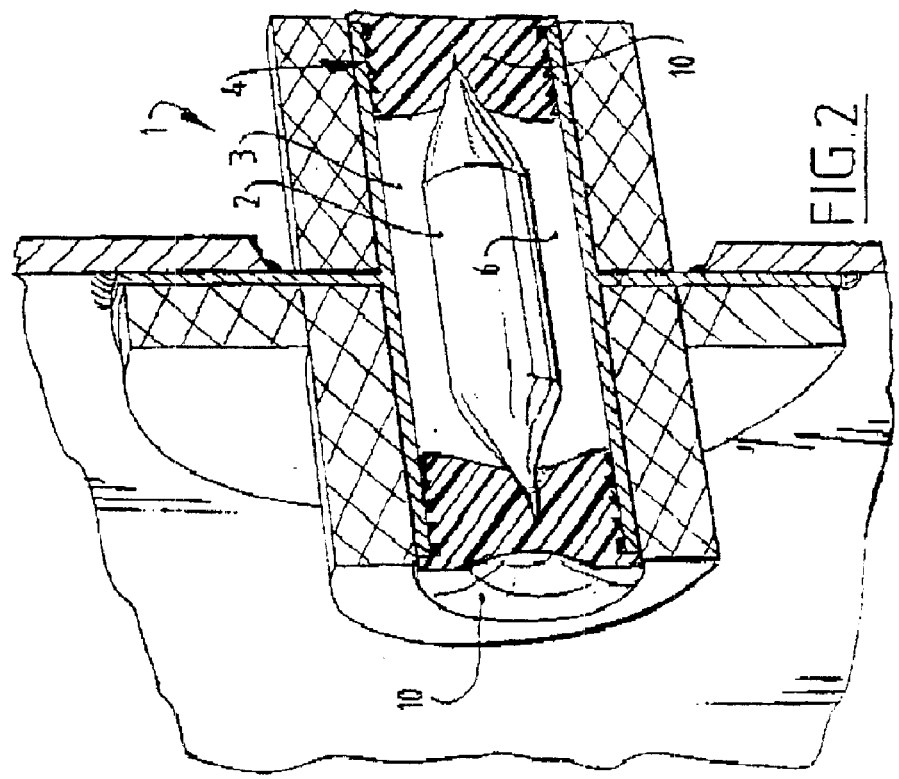
FIG. 1 shows the sealing system at a usual prevailing temperature.
Figure 2:
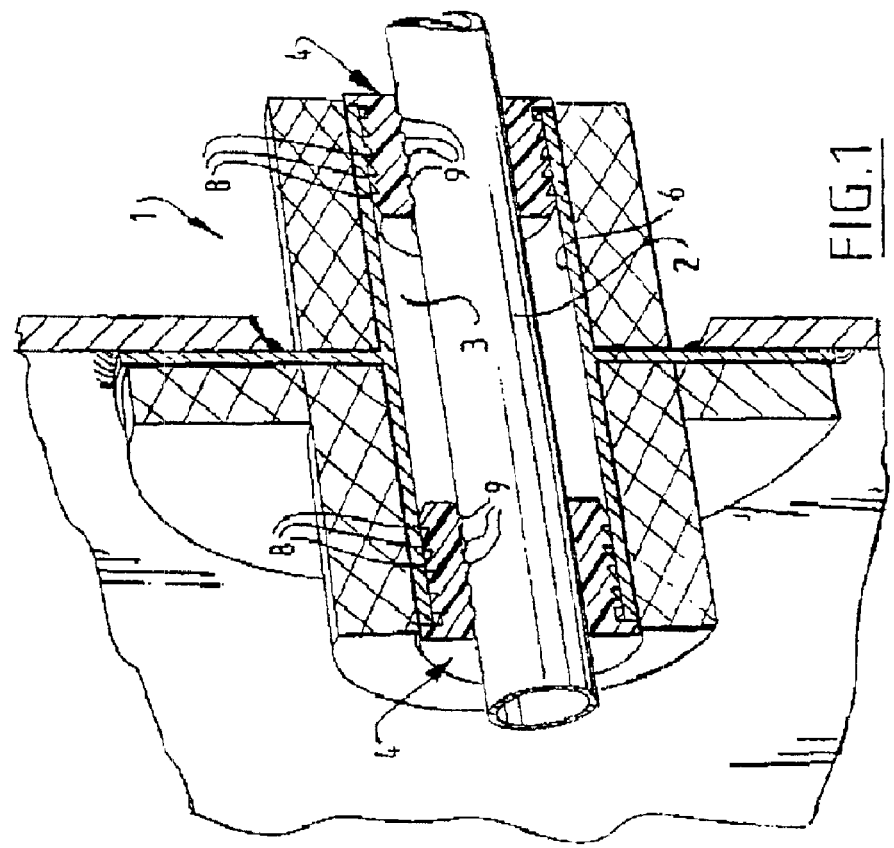
FIG. 2 shows the sealing system of FIG. 1 at a higher temperature.

The sealing system 1 is made up of a tube 2, which tube extends through a co-axial lead-through housing 3, and a gasket 4. Gasket 4 is made up of two longitudinal halves, whose plane of division coincides with the plane of the sectional view in the drawing. The longitudinally dividable gasket 4 collars tube 2 with a fixed clamp at the location of the two circular spaces 6. To this end, gasket 4 includes two kinds of ribs, viz. outer, angular ribs 8 and inner trapezoidal ribs 9.

In the event of a temperature increase of tube 2 to a temperature above the plasticizing point, an expansion reaction will take place as a result of the composition of gasket 4. Said expansion reaction, which is mainly caused by expansion of the expandable graphite in the examples, causes the cylindrical tube 2 to be compressed. The fact of the matter is that expandable graphite has been found highly suitable for causing the gasket to expand and thus block the lead-through housing in fire situations. Gasket 4 will swell to such an extent that the lead-through housing 3 is blocked as a result of a plug being formed therein, to such an extent that passage is neither possible through tube 2 nor through lead-through housing 2 any more. The expanded gaskets form a sealing plug 10 for lead-through housing 3 and a clamped seal of tube 2.

Thus an enhanced degree of safety is provided in the event of a fire, and this without any need of a volume outside the lead-through housing 3, as is known from the prior art, since plug 10 is disposed substantially entirely within the lead-through housing 3.

It stands to reason that the temperature range of the deformation or softening of the collared tube does not need to be identical to or overlap the temperature range of the expansion reaction of the gasket.

For plastics, for example, deformation commences at temperatures which are generally lower than the temperature at which the expansion reaction commences.

Thus the deformation temperature for PVC is about 80° C., for PE about 110° C. and for PP about 150° C. The optimum temperature for the expansion of expandable graphite is about 200° C. At this temperature the tube as such will have softened to such an extent that said clotting can take place even more forcefully due to displacement and crushing of the tube in the lead-through housing. In fire conditions these temperatures are always exceeded, however.

What is claimed is:

1. A system comprising a cylindrical tube having a passageway therethrough, the tube constructed of a material that is capable of deformation under the influence of a temperature increase, and a gasket forming a collar around the tube, said gasket being made of a fire-retardant material with a base of a cross-linkable material and an expandable material, whereby the said gasket is constructed and arranged to expand after the plasticizing point of the tube is reached and to such an extent that the tube is compressed substantially closing the passageway and a medium-tight seal of a lead-through housing and the tube is obtained, characterized in that said tube is made of a plastic or a composite material and in that the gasket has a base of a rubber material containing 2–25% by weight of graphite, wherein said gasket is in the form of a plug for being sealingly inserted into a circular space that is formed between a lead-through housing coaxial with the tube and the tube that extends therethrough.

2. The system according to claim 1, wherein said tube is made of a multilayer composite material consisting of a plastic layer aluminum layer-plastic layer.

3. The system according to claim 1, wherein said expandable material is graphite in an amount of 2–25% by weight.

4. The system according to claim 3, wherein said expandable material is graphite in an amount of 10–15% by weight, preferably 12.5% by weight.

5. The system according to claim 1, wherein said cross-linkable polymer is composed of at least one rubbery linear polymer with the usual fillers, plasticizers and vulcanization materials, such as sulphur, vulcanization accelerators and activators, as well as 50–200 parts by weight of aluminum oxide hydrate for every 100 parts by weight of said at least one polymer.

6. The system according to claim 1, wherein said plug comprises circular outer ribs and circular inner ribs, which outer ribs have an outside diameter which is larger than the inside diameter of the outer passage, and wherein the inside diameter of the inner ribs is at least substantially the same as the outside diameter of the tube.

7. The system according to claim 1, wherein said plug consists of at least two shell parts, an abutting boundary surfaces of the at least two shell parts extend at least substantially axially and the rear flanks in the direction of insertion, and an outer, serrated ribs extend radially, and inner ribs are arranged in pairs in the radial area of the outwardly extending peaks of the outer serrated ribs.

8. The system according to claim 7, wherein the inner ribs exhibit a trapezoidal shape in the direction of the axial longitudinal section.

9. Gasket in form of a plug being made of a fire-retardant rubber with a base of a cross-linkable material and an expandable material being graphite in an amount of 2–25% by weight to be used in a system according to claim 1.

10. A system comprising a cylindrical tube of a material that is capable of deformation under the influence of a temperature increase, and a gasket forming a collar around the tube, said gasket being made of a fire-retardant material with a base of a cross-linkable material and an expandable material, in such an amount of and of such a composition that a temperature increase above the plasticizing point of the tube will cause the gasket to expand to such an extent that the tube is compressed and a medium-tight seal of a lead-through housing and the tube is obtained, characterized in that said tube is made of a plastic or a composite material and in that the gasket has a base of a rubber material containing 2–25% by weight of graphite, wherein said gasket is in the form of a plug for being sealingly inserted into a circular space that is formed between a lead-through housing coaxial with the tube and the tube that extends therethrough, wherein said plug comprises circular outer ribs and circular inner ribs, which outer ribs have an outside diameter which is larger than the inside diameter of the outer passage, and wherein the inside diameter of the inner ribs is at least substantially the same as the outside diameter of the tube.

11. A system comprising a cylindrical tube of a material that is capable of deformation under the influence of a temperature increase, and a gasket forming a collar around the tube, said gasket being made of a fire-retardant material with a base of a cross-linkable material and an expandable material, in such an amount and of such a composition that a temperature increase above the plasticizing point of the tube will cause the gasket to expand to such an extent that the tube is compressed and a medium-tight seal of a lead-through housing and the tube is obtained, characterized in that said tube is made of a plastic or a composite material and in that the gasket has a base of a rubber material containing 2–25% by weight of graphite, wherein said gasket is in the form of a plug for being sealingly inserted into a circular space that is formed between a lead-through housing coaxial with the tube and the tube that extends therethrough, wherein said plug consists of at least two shell parts, an abutting boundary surfaces of the at least two shell parts extend at least substantially axially and the rear flanks in the direction of insertion, and an outer, serrated ribs extend radially, and inner ribs are arranged in pairs in the radial area of the outwardly extending peaks of the outer serrated ribs.

12. The system according to claim 11, wherein the inner ribs exhibit a trapezoidal shape in the direction of the axial longitudinal section.

* * * * *